United States Patent
Lin et al.

(10) Patent No.: US 7,289,628 B2
(45) Date of Patent: Oct. 30, 2007

(54) OZONE FUNCTIONS HANDSET

(76) Inventors: Yu-Yueh Lin, 3F, No. 17, Jiang-Nan St., Neihu District, Taipei (TW); Kun-Jung Yang, No. 40, Lane 113, Hangjou Rd., Jungii City, Taoyuan (TW); Hai-Yau Ho, 2F, No. 14, Lane2, Tai-Shun St., Da-An District, Taipei (TW)

( * ) Notice: Subject to any disclaimer, the term of this patent is extended or adjusted under 35 U.S.C. 154(b) by 516 days.

(21) Appl. No.: 10/997,954

(22) Filed: Nov. 29, 2004

(65) Prior Publication Data

US 2006/0116159 A1    Jun. 1, 2006

(51) Int. Cl.
*H04M 9/00* (2006.01)
*H04M 1/00* (2006.01)

(52) U.S. Cl. .................... 379/439; 379/452; 455/556.1
(58) Field of Classification Search ................ 379/439, 379/452; 455/550.1, 556.1, 573
See application file for complete search history.

(56) References Cited

U.S. PATENT DOCUMENTS

| | | | |
|---|---|---|---|
| 4,736,416 A * | 4/1988 | Weinert | 379/439 |
| 5,708,708 A * | 1/1998 | Sacristan | 379/452 |
| 6,301,359 B1 * | 10/2001 | Roberts | 379/452 |
| 6,490,351 B1 * | 12/2002 | Roberts | 379/452 |
| 2004/0147293 A1 * | 7/2004 | Park | 455/573 |
| 2006/0116159 A1 * | 6/2006 | Lin et al. | 455/556.1 |

FOREIGN PATENT DOCUMENTS

WO    WO9833310 A1 *   7/1998

* cited by examiner

*Primary Examiner*—Curtis Kuntz
*Assistant Examiner*—Phylesha L Dabney
(74) *Attorney, Agent, or Firm*—Lowe Hauptman Ham & Berner, LLP

(57) ABSTRACT

An ozone functions handset is to provide a sterilizer to a certain handset. Select a place inside the handset, best near the mouthpiece to install a small sized ozone gas producing unit, to start up the ozone gas producing unit by directly using the internal power supply of the phone, then the ozone gas emanates from the eyelets in the shell of the handset, as to sterilize and disinfect the nearby environment and the handset itself, and purify the atmosphere around.

7 Claims, 10 Drawing Sheets

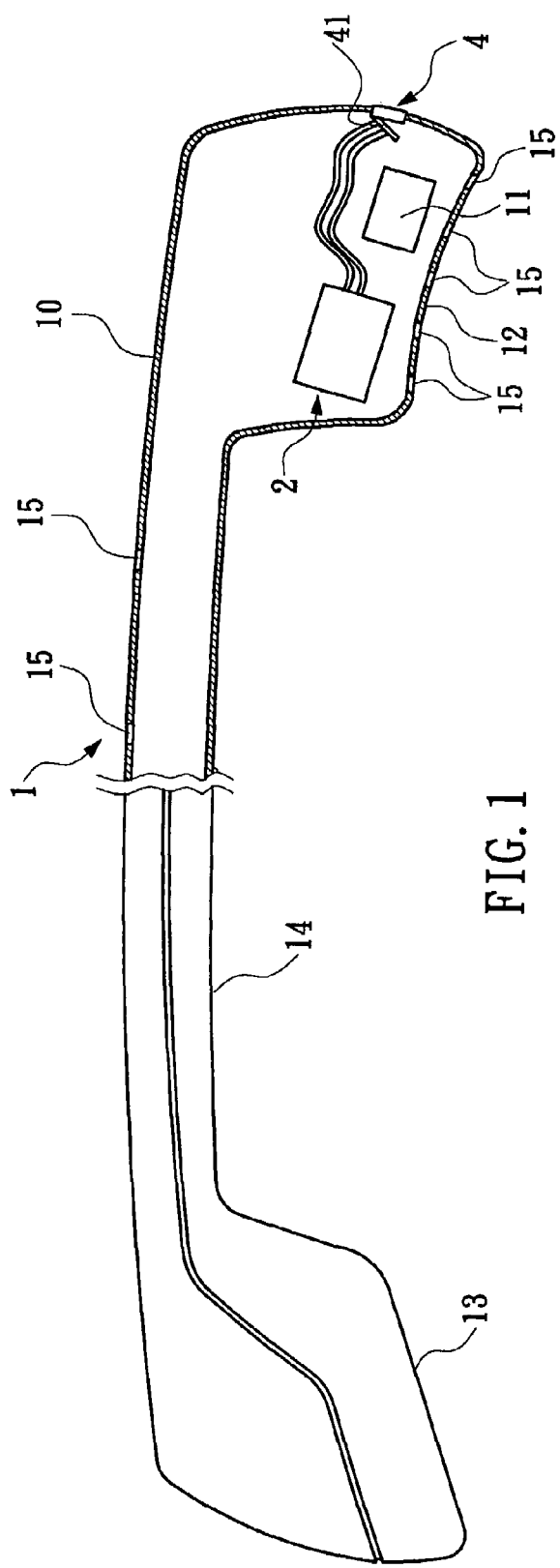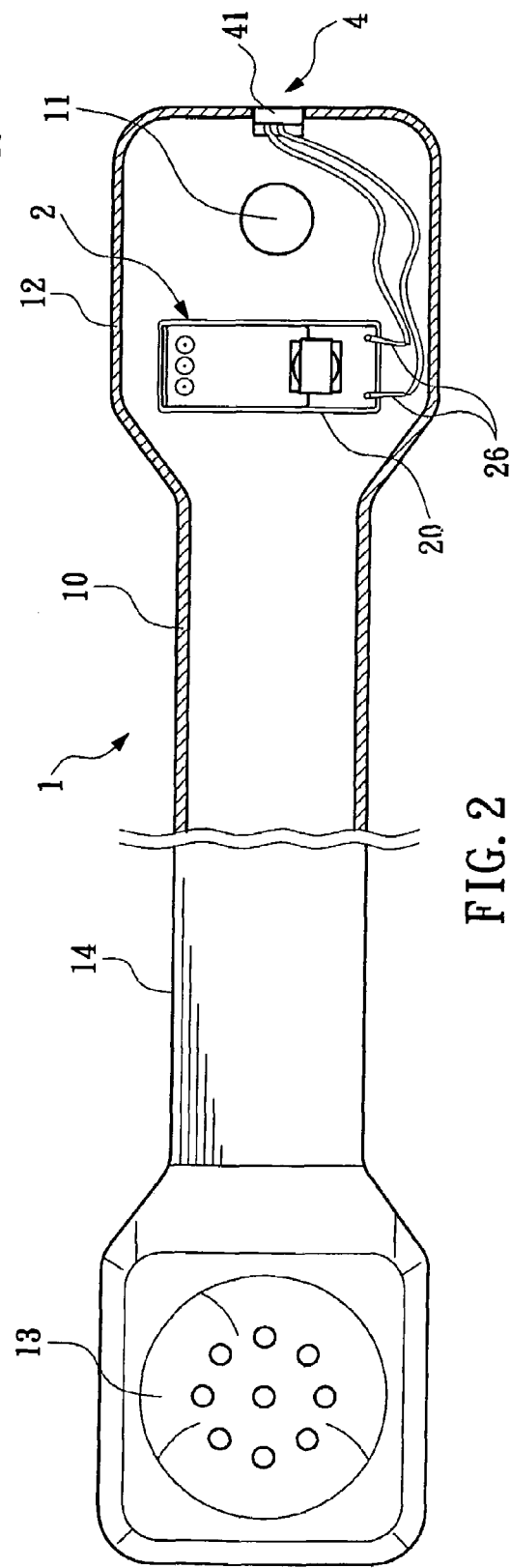

OZONE FUNCTIONS HANDSET

BACKGROUND OF THE INVENTION

The present invention relates to an ozone functions handset, more particularly to an ozone gas producing unit designed inside the handset to produce ozone gas. When the handset is on-hook, the ozone gas would emanate from the eyelets in the handset shell by starting up the ozone gas producing unit through connecting it with the power supply in the handset, to sterilize and disinfect the nearby environment and the handset itself, and purify the atmosphere around.

Telephone, a common communication tool, will be directly contacted or closed by the users' hands, ears, or mouths when it is used. As a result, telephones, especially those in offices, become a media for pathogen to spread out. Obviously, it is very important to keep telephones sanitary. Up to now, there are several inventions designed to keep telephones or their handsets sanitary, such as U.S. Pat. No. 4,613,928, U.S. Pat. No. 4,736,416, U.S. Pat. No. 6,301,359 B1 and U.S. Pat. No. 6,490,351 B1, however, the sterilizers of the patents mentioned above are too large to be installed inside the handsets, only to be installed into the handsets, like U.S. Pat. No. 4,736,416, or on the handsets, like U.S. Pat. No. 6,301,359 B1 and U.S. Pat. No. 6,490,351 B1. These designs not only spoil the appearance of the phones, but also decrease the purchase desire of customers. Consequently, they are inconvenient in daily use and difficult to be popular.

SUMMARY OF THE INVENTION

The primary object of the present invention is to provide a handset with ozone functions, inside which, a space, better close to the mouthpiece, is for installing the ozone gas producing unit. When the handset is on-hook, the ozone would emanate from the eyelets on the handset shell by starting up the ozone gas producing unit through connecting it with the power supply in the handset, to sterilize and disinfect the nearby environment and the handset itself, and purify the atmosphere around.

The further object of the present invention is to provide a handset with ozone functions, whose ozone gas producing unit is provided with electricity from a discharging needle set in a electric device, and installed inside the handset to become a small sterilizer.

The another object of the present invention is to provide a handset with ozone functions, which is installed a link-and-off device between the handset and phone. For example, fix one metal patch at the hemline of the mouthpiece, while the other metal patch at the corresponding point in the groove of the handset, to connect the electricity device when the handset is on-hook. So, the ozone gas producing unit can start up with the electricity and produce ozone gas.

BRIEF DESCRIPTION OF THE DRAWINGS

The structure and the technical means adopted by the present invention to achieve the above and other objects can be best understood by referring the following detailed description of the preferred embodiments and the accompanying drawings, wherein:

FIG. 1 is a side cross-sectional view of an embodiment for this invention.

FIG. 2 is a frontal cross-sectional view of the handset shown in FIG. 1.

DETAILED DESCRIPTION OF THE PREFERRED EMBODIMENT

Figure 3:
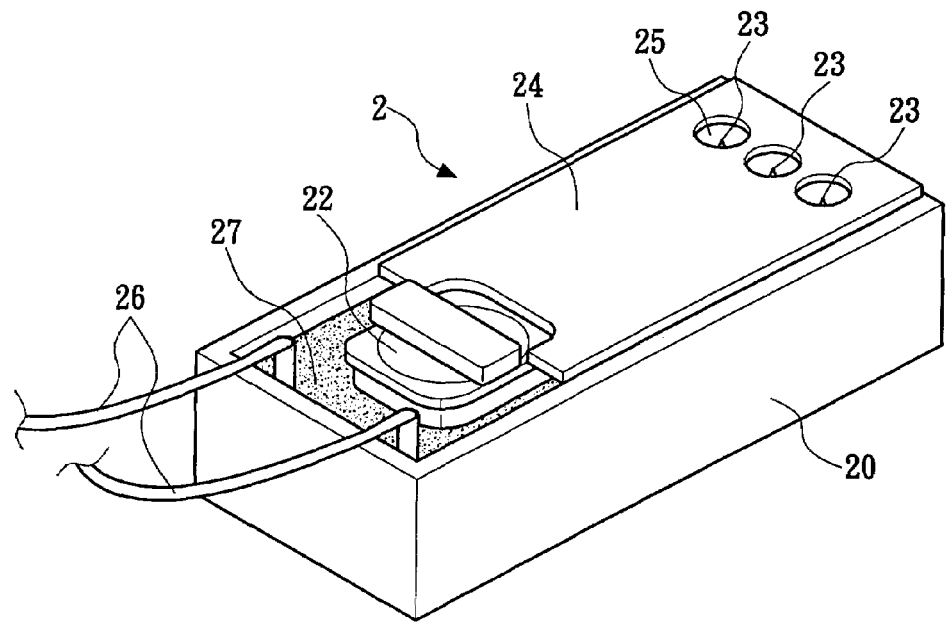
FIG. 3 is a perspective view of an embodiment of ozone gas producing unit shown in FIG. 1.
Figure 4:
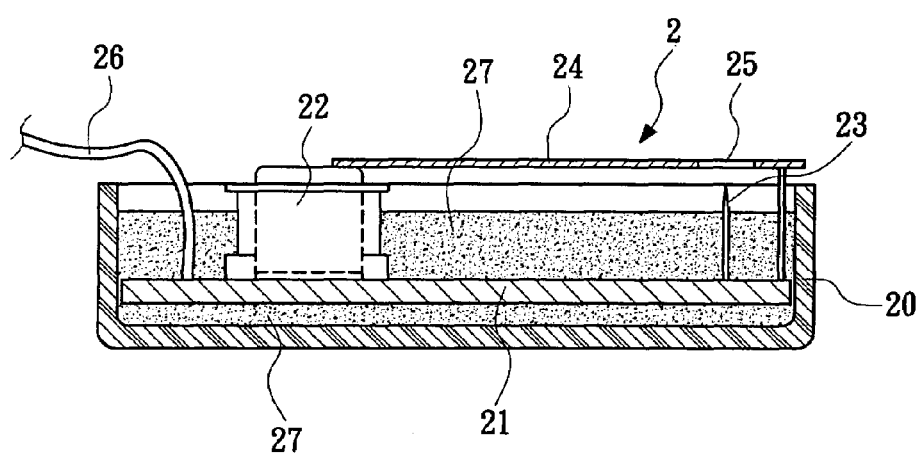
FIG. 4 is a side cross-sectional view of the ozone gas producing unit shown in FIG. 3.

Referred to FIG. 1, 2, the handset of this invention is composed of shell 10 and internal electronic item 11, like microphone, as to form the mouthpiece 12, earpiece 13 and handpiece 14. The characteristics are that: select a suitable place inside the shell 10 of handset 1, e.g. the place close to mouthpiece 12, then install here a small ozone gas producing unit 2. As seen from FIG. 6, 8, when handset 1 is on-hook in the groove 31 of the phone 3, it could be connected with phone 3 by the link-and-off device 4, as to start up the ozone gas producing unit 2 by the power supply in phone 3 to produce ozone gas. Then the ozone gas flows to mouthpiece 12, earpiece 13, and handpiece 14 of handset 1, and emanates from the pre-set eyelets 15 on the shell 10, e.g. eyelets 15 on mouthpiece 12, earpiece 13, and handpiece 14, to sterilize and disinfect the nearby environment of phone 3 and the handset 1 itself, and purify the atmosphere around to avoid pathogen hoarding and spreading out.

Figure 5:
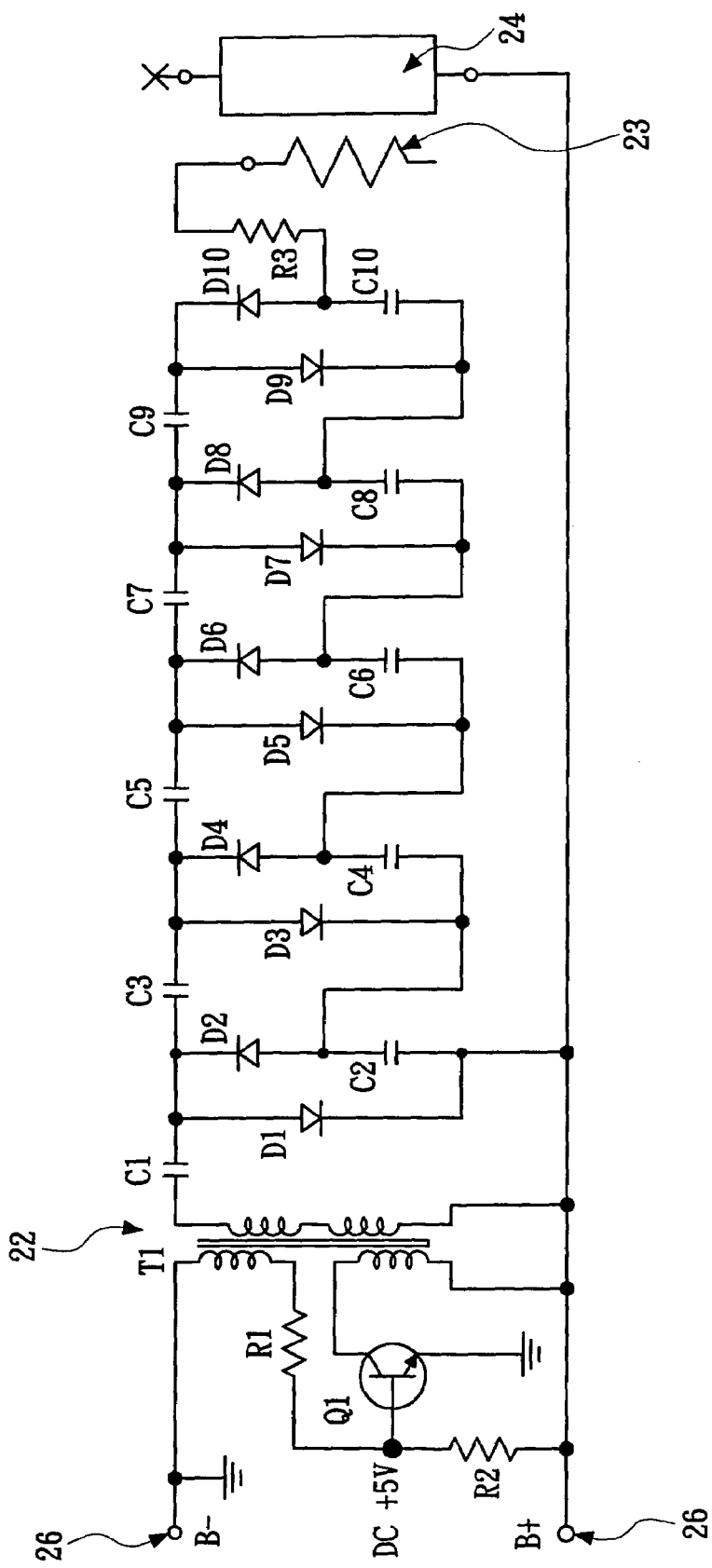
FIG. 5 is a circuit sketch map of the ozone gas producing unit in shown FIG. 3.

The space inside the handset 1 is limited, thus the ozone gas producing unit must reach the requirement of being small sized or a combinational group, as to be easily put inside the handset 1 while not effecting its functions. The ozone gas producing unit 2 in this invention, see FIG. 3, 4, 5, producing ozone gas by the power provided from the discharging needle set in the electric device, is composed of a insulative box 20, a circuit board 21 at the bottom of the insulative box 20, and a small sized transformer 22 on the circuit board 21, to transform electric pressure into low electric current in high electric pressure. On the circuit board 21 is placed with several electrode needles 23 as well as an eyelet board 24 with opposite-electrodes. On the eyelet board 24 is set several eyelets 25 corresponding with the electrode needles 23 on the circuit board 21, and the center of each eyelet 25 is exactly the top of the electrode needle 23. One anode wire 26 and one cathode wire 26 (power supply wires) spread from circuit board 21 to connect with external power supply. Insolative colophony layer 27, like Bpoxy, can be infused into insolative box 20 to wrap circuit board 21, bringing a great effect of insulation and heat insulation. The above-mentioned structure is good for reducing the volume of the ozone gas producing unit 2, and makes it easy to be installed in handset 1. When it is working, electricity, discharged from top of electrode needles 23 by high electric pressure, brings concussion between the anode and cathode electrodes with the effect of the opposite electrodes in eyelets 25 on board 24. Then the air around begins to be of ionization, so the oxygen molecule gets one more anion to become ozone. Moreover, the electricity discharged from top of the needles, as shown in FIG. 5, can also produce anion, which has great benefit for human body.

Figure 6:
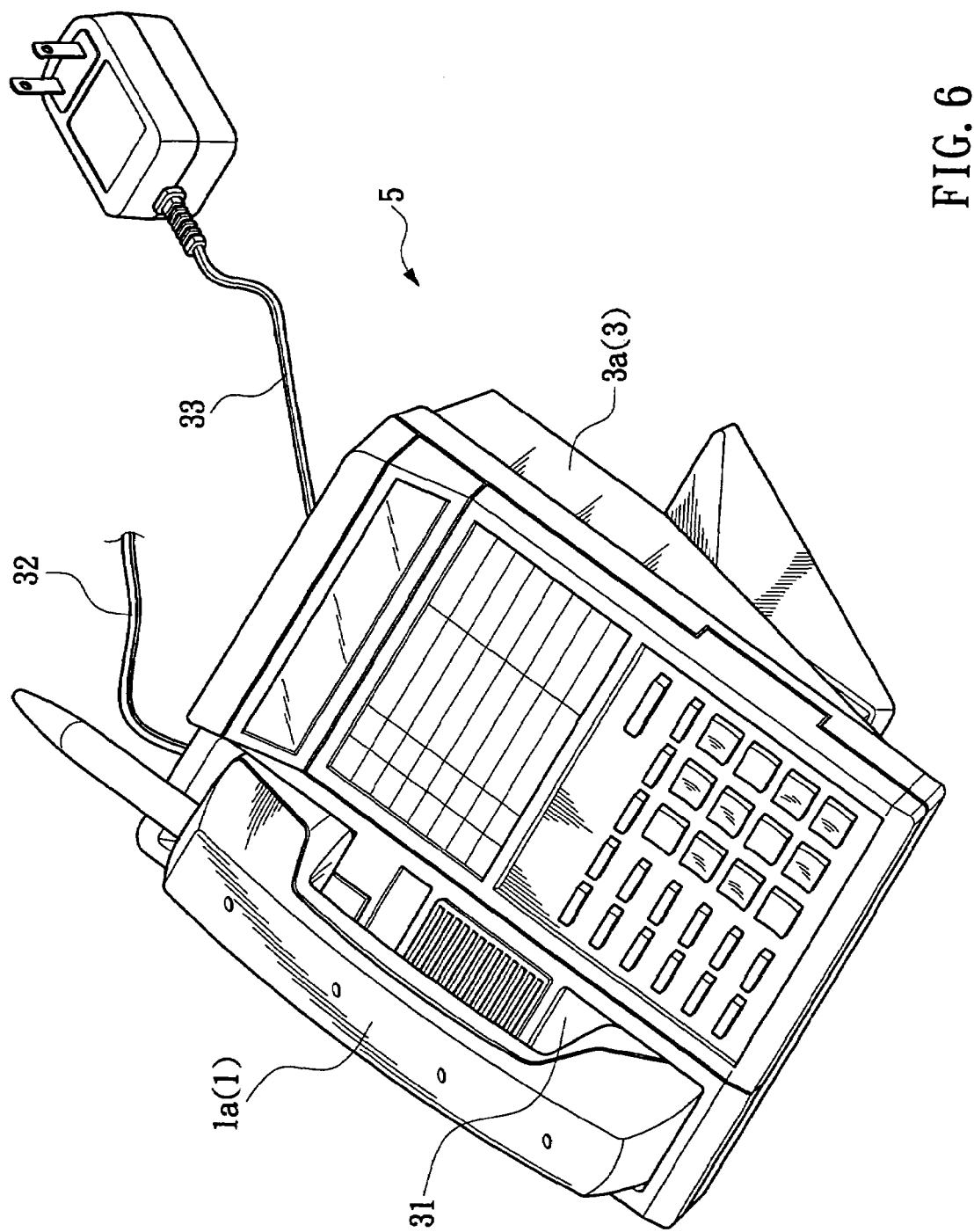
FIG. 6 is a perspective view of this invention used in a wireless phone.
Figure 7:
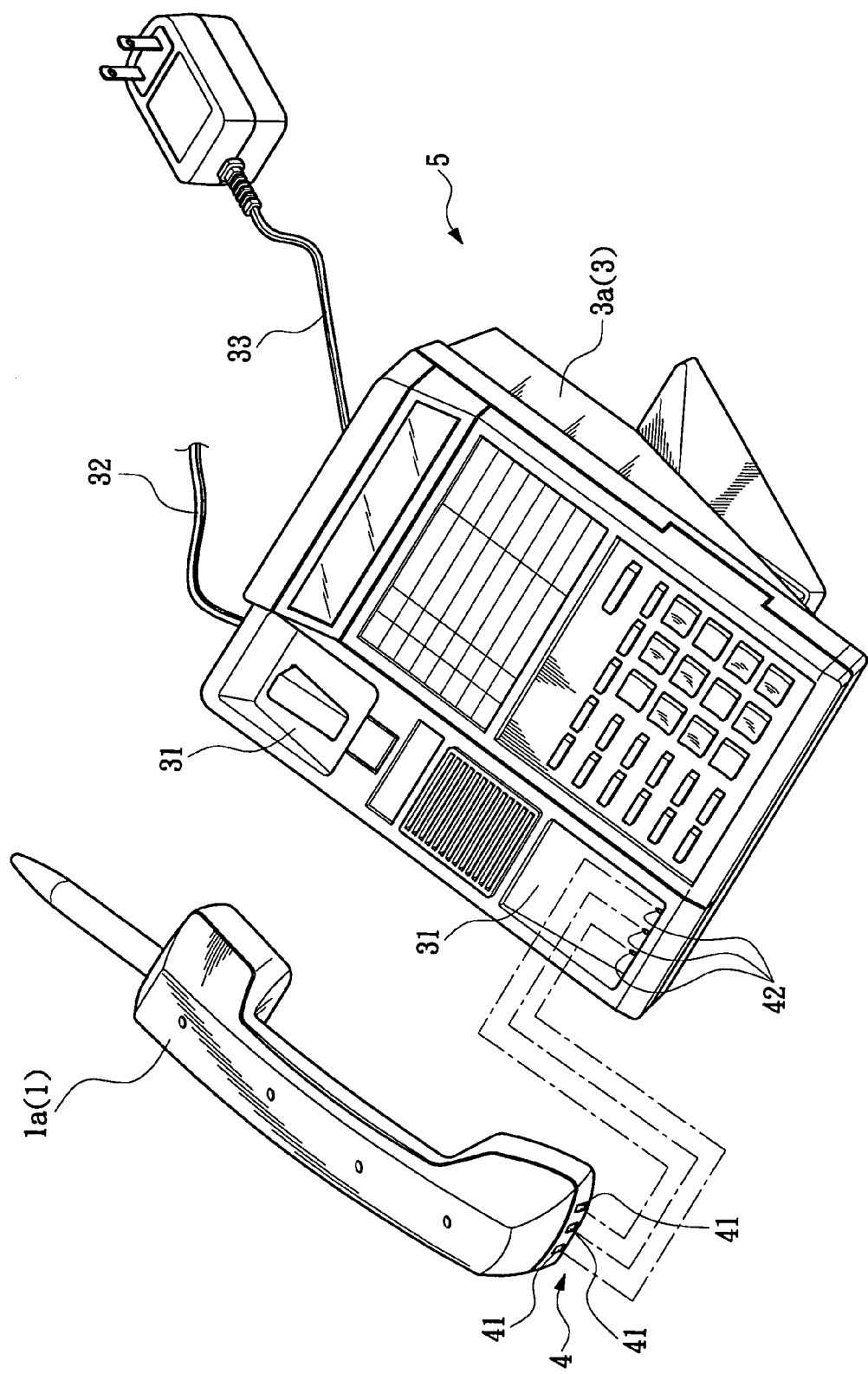
FIG. 7 is a perspective view of the link-and-off device between handset and phone shown in FIG. 6
Figure 8:
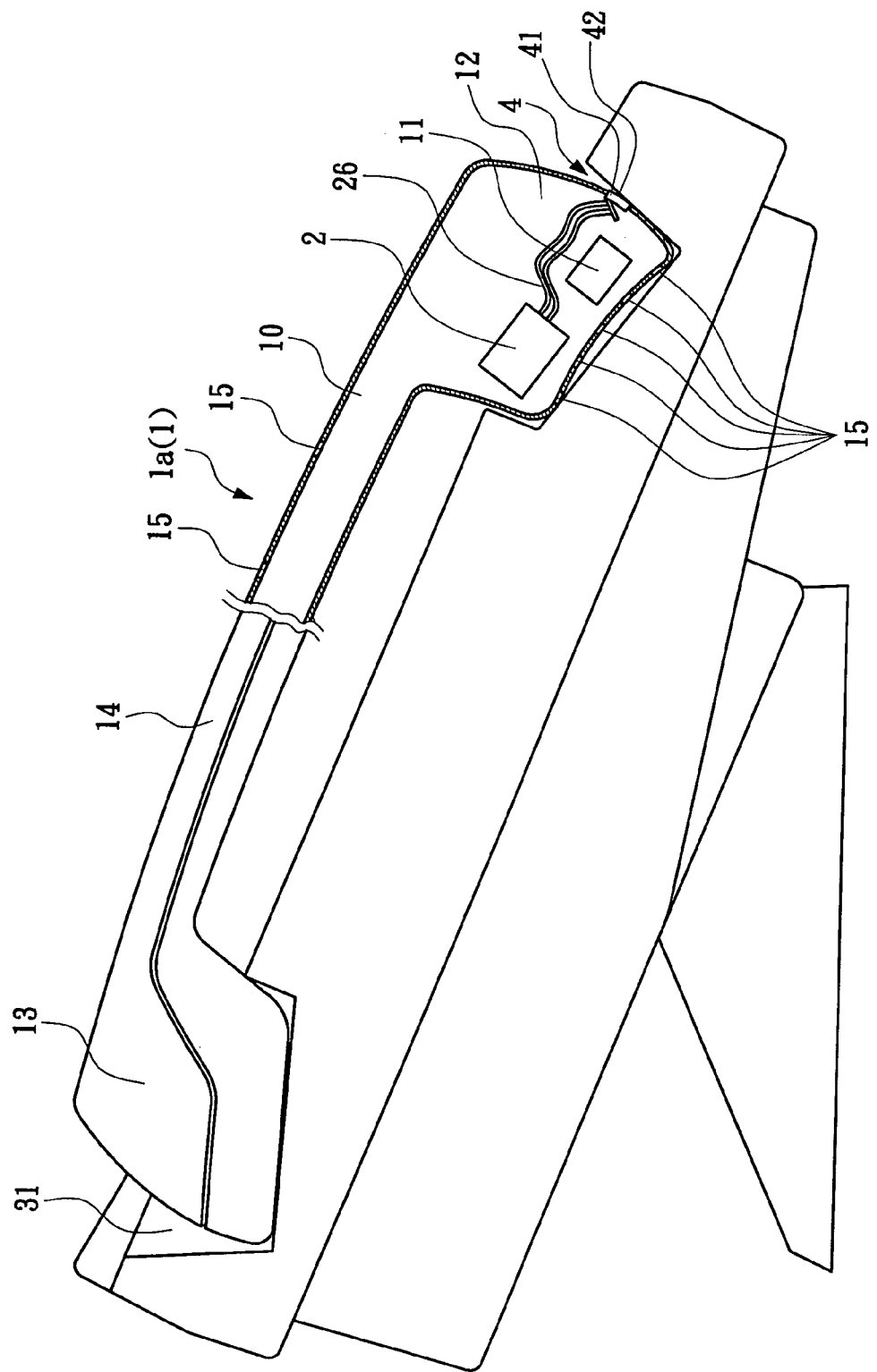
FIG. 8 is a side cross-sectional view of the embodiment shown in FIG. 6 in use.
Figure 9:
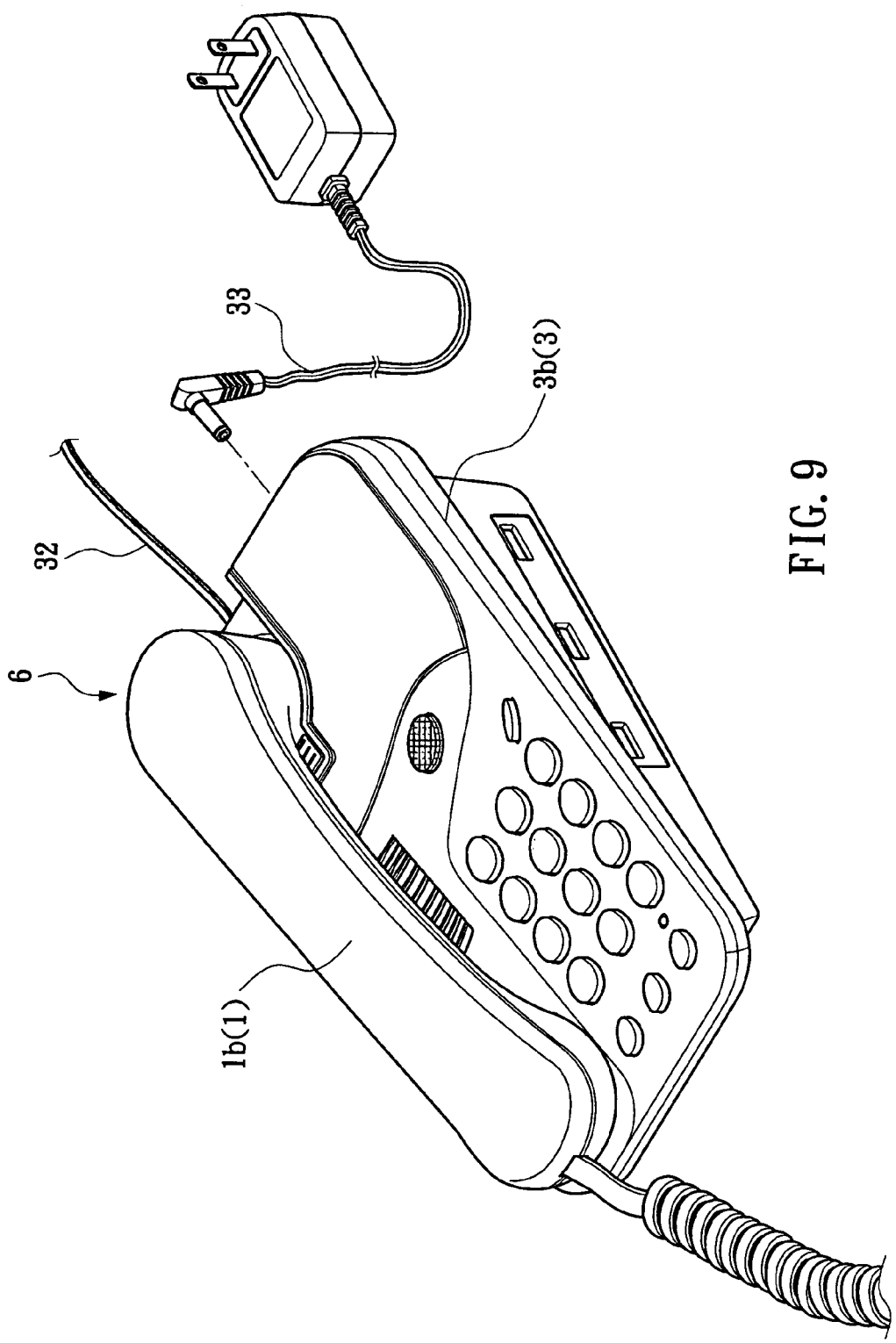
FIG. 9 is a perspective view of this invention used in IP phones.
Figure 10:
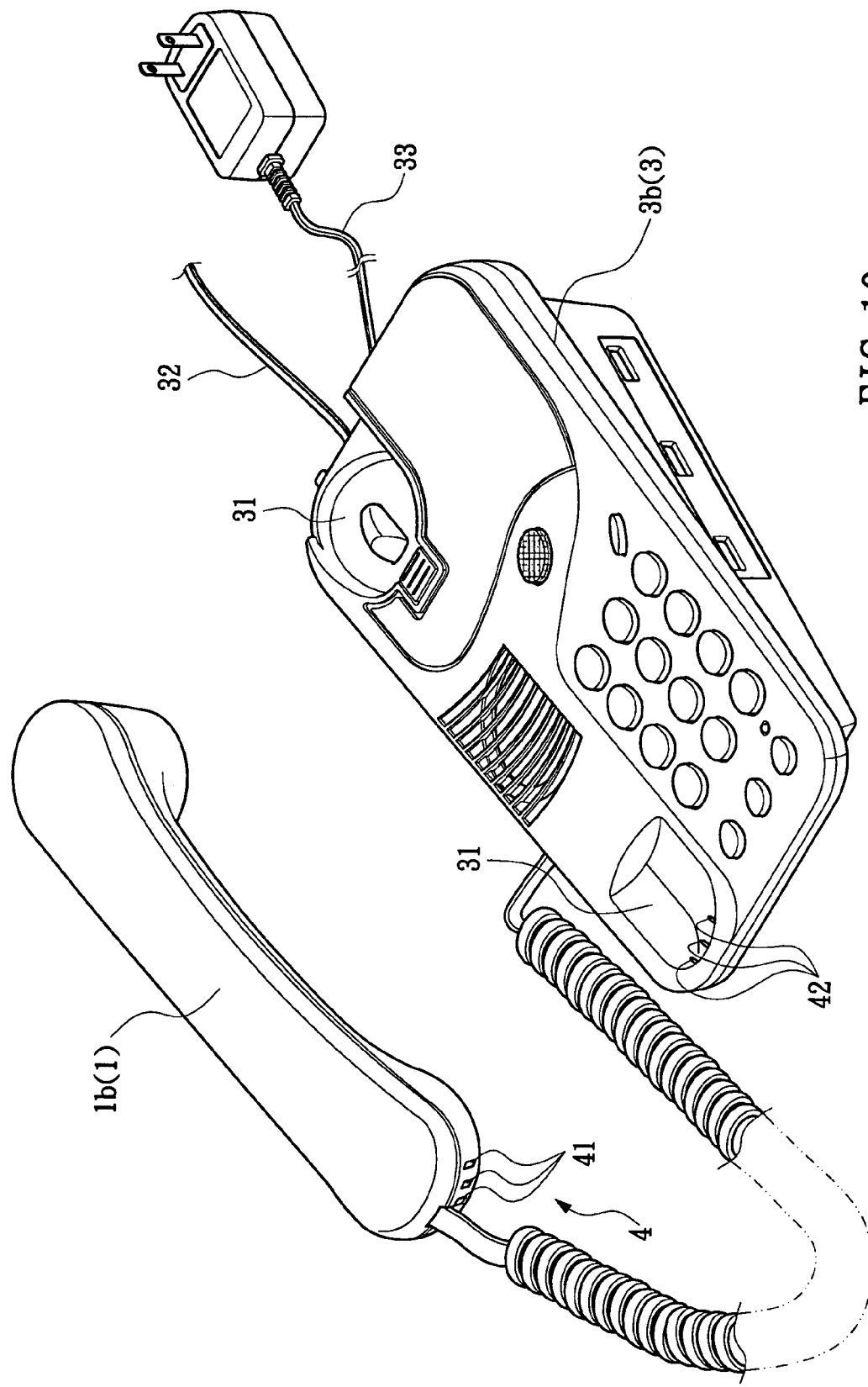
FIG. 10 is a perspective view of the link-and-off device between handset and phone shown in FIG. 9.
Figure 11:
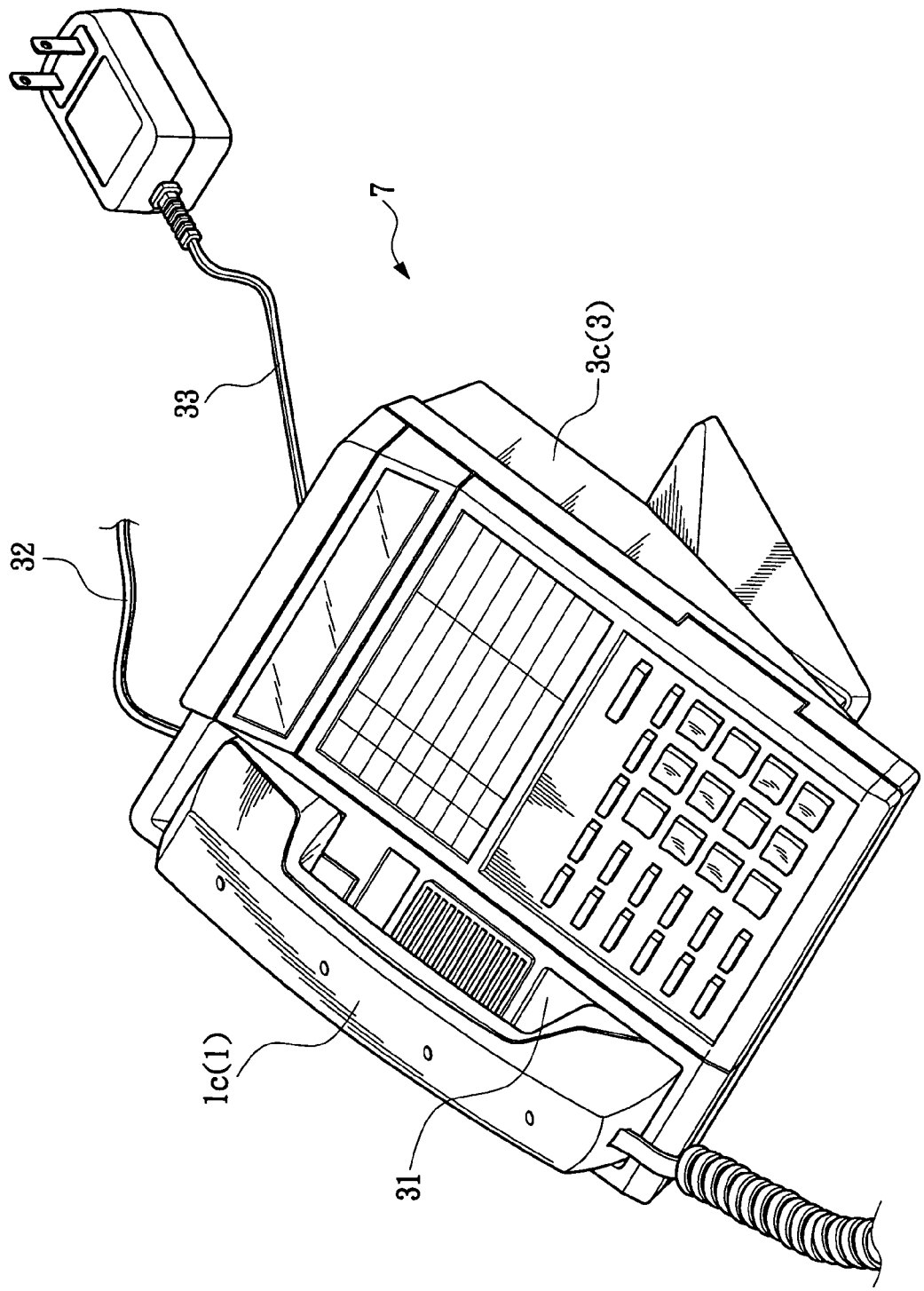
FIG. 11 is a perspective view of this invention used in common phones.
Figure 12:
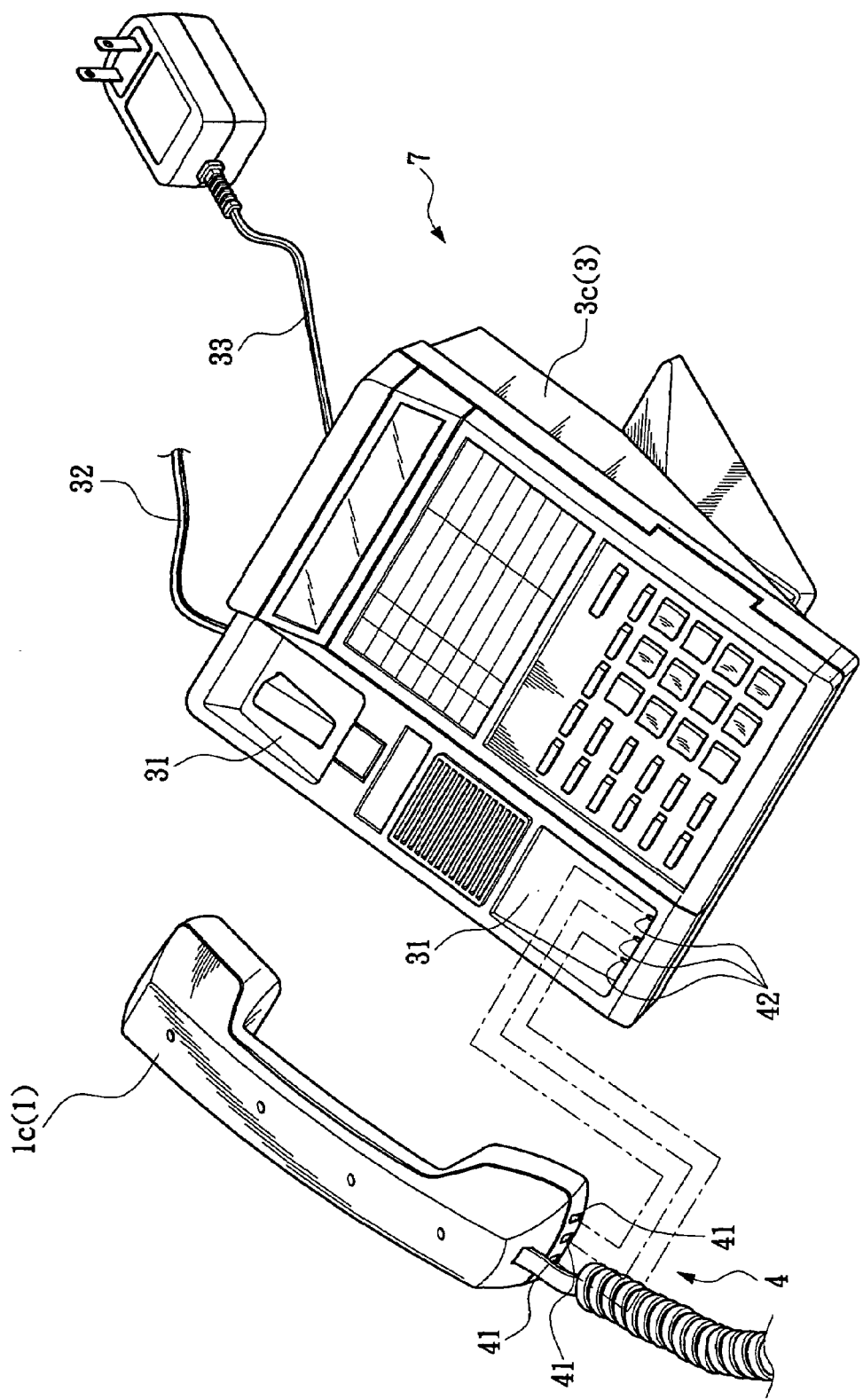
FIG. 12 is a perspective view of the link-and-off device between handset and phone shown in FIG. 11.

The phones used at present include wireless phones as shown in FIG. 6, IP phones as shown in FIG. 9, and common phones as shown in FIG. 11. Because power supply for wireless phone, IP phone and common phone is different, the power supply of ozone gas producing unit 2 differs as well. See FIG. 6, a wireless phone 5 has a handset 1a and a phone 3a, wherein, phone 3a is connected with wire (partial line) 32, besides, it should be connected with other power supply (like common power supply inside room) through another wire 33 as a driving power supply for the wireless system to send and receive signals, the same is that the wireless handset 1a is also equipped with a charge battery to sand and receive signals. See FIG. 7, there is a link-and-off device 4 between handset 1a and phone 3a, and a mental patch 41 is set at the bottom of mouthpiece 12 of handset 1a, and another patch 42 at the corresponding place in the handset groove 31 of phone 3a. When handset 1a is on-hook in groove 31, patch 41 and patch 42 contacts with each other, making the charge battery in handset 1a to be connected with the power supply of phone 3a through the link-and-off device 4 to supply power for handset 1a. Thus in this invention, the anode and cathode wires 26 (power supply wires) of ozone gas producing unit 2 in handset 1a can be connected with patch 41. When handset 1a is on-hook in the handset groove 31, synchronously ozone gas producing unit 2 could directly use the power supply of phone 3a to produce ozone gas. The operation manner of ozone gas producing unit 2 can be fixed in advance by designing circuit, say, it operates for a period of 30 seconds for example and closes down automatically, or operates for a period every other minutes when the handset is on-hook.

See FIG. 9, 10, IP phone 6 includes a handset 1b and a phone 3b, wherein, phone 3b use wire (partial wire) 32 to connect digital machine and then to connect the Internet, while it use wire 33 to connect external power supply. As the wireless phone 5 shown in FIG. 7, a link-and-off device 4 is set between handset 1b and phone 3b. When handset 1b is on-hook in the groove 31, synchronously ozone gas producing unit 2 could directly use the power supply of phone 3b to produce ozone gas. The operation manner of ozone gas producing unit 2 can be designed in advance the same as that in wireless phone 5. If phone 3b is connected directly with host computer, ozone gas producing unit 2 could directly use the power supply of host computer as driving power supply.

See FIG. 11, 12, a common phone 7 includes a handset 1c and a phone 3c, wherein, phone 3c is only connected with phone wire (partial wire), but the power supplied by this wire is too limited to drive ozone gas producing unit 2 for most of the time. So we can use wire 33 to connect external power supply, as to connect ozone gas producing unit 2 of handset 1 with the power supply in phone 31. When handset 1c is on-hook in the groove 31, synchronously ozone gas producing unit 2 could directly use the external power supply of phone 3c to produce ozone gas. The operation manner of ozone gas producing unit 2 can be designed in advance the same as those of wireless phone 5 or IP phone 6.

What is claimed is:

1. An ozone functions handset comprising a shell and internal electronic items, including mouthpiece, earpiece and handpiece, and being used together with a telephone, wherein:
    an ozone gas producing unit is installed at a place inside the shell of the handset, and a link-and-off device is set between handset and phone;
    when the handset is on-hook in groove of the phone, the handset can be connected with the power supply of the phone by the link-and-off device to start up the ozone gas producing unit to produce ozone gas by using the external power linking to the phone; then the ozone gas produced by the ozone gas producing unit can emanates from the eyelets in the shell of the handset.

2. The ozone functions handset as claimed in claim 1, wherein said link-and-off device includes a patch set at hemline of the mouthpiece of the handset, which is connected with the power supply wire of ozone gas producing unit inside the handset; a matching mental patch set at the corresponding place in the groove of the phone. When the handset is on-hook in the groove, the wire of the ozone gas producing unit could be connected with the power supply of phone through the link-and-off device to start up and produce ozone gas.

3. The ozone functions handset as claimed in claim 1, wherein said ozone gas producing unit can be fixed inside a shell-shaped insulative box.

4. The ozone functions handset as claimed in claim 1, wherein said ozone gas producing unit may includes a circuit board fixed at bottom of an insulative box; a small sized transformer set on the circuit board; several electrode needles as well as an eyelet board with opposite electrodes placed on the circuit board with each eyelet corresponding with an electrode needles; one anode wire and one cathode wire spread from the circuit board to connect external power supply; an insolative colophony layer be infused into the insolative box to wrap the circuit board. The above-mentioned structure is good for reducing the volume of the ozone gas producing unit, and makes it easy to be installed in handset.

5. The ozone functions handset as claimed in claim 1, wherein said eyelets in shell of the handset includes those designed on mouthpiece and earpiece.

6. The ozone functions handset as claimed in claim 1, wherein said power supply of the phone includes the external power supply connected by electric wire.

7. The ozone functions handset as claimed in claim 1, wherein said power supply of the phone includes that of the host computer when they are connected.

* * * * *